3,180,334
ENEMA RETENTION CUP
Lorena L. Glenn, 2315 NE. 65th St., Seattle, Wash.
Filed Aug. 11, 1961, Ser. No. 130,953
2 Claims. (Cl. 128—245)

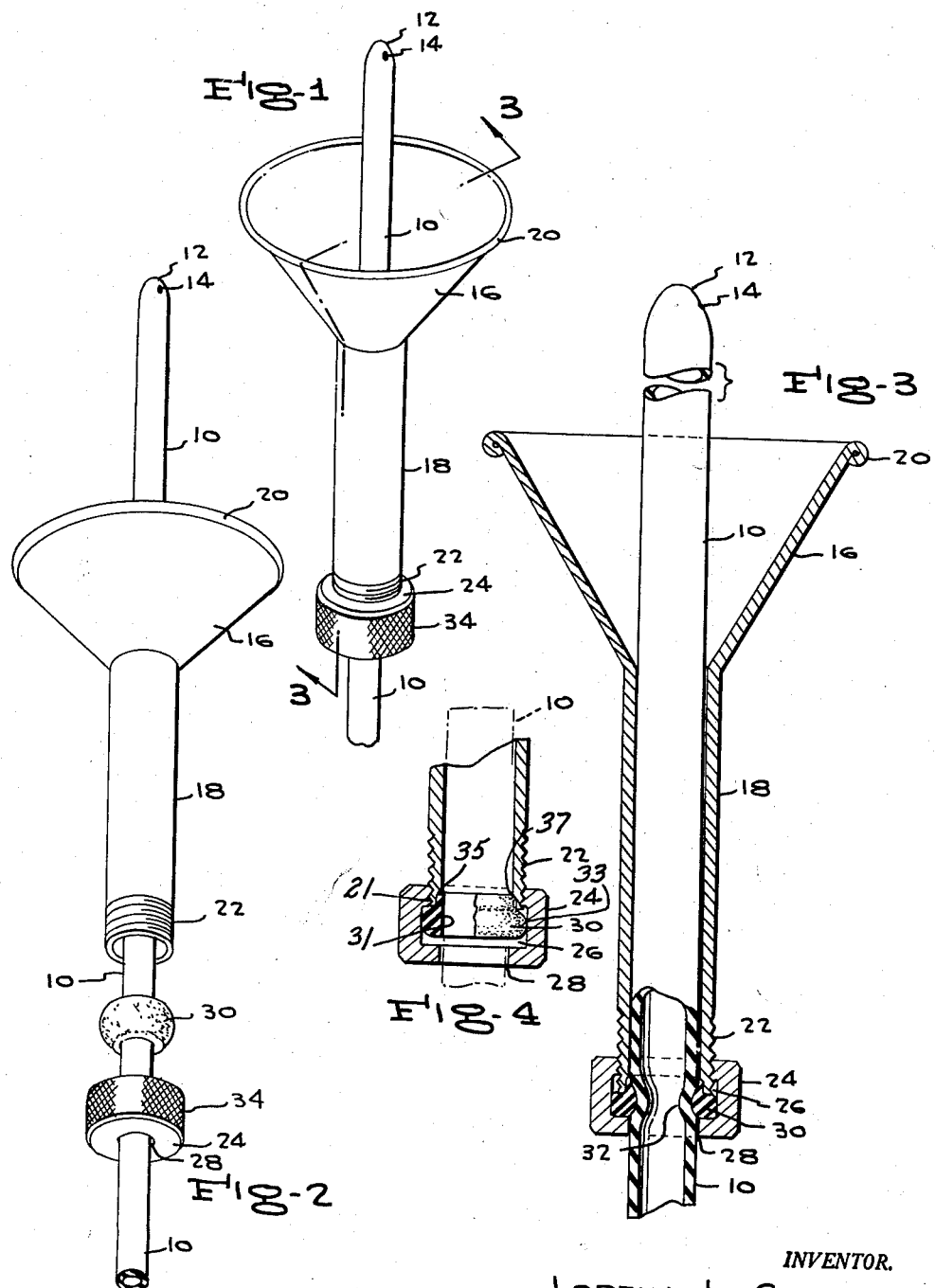

This invention relates to an enema administering nozzle having a retaining cup, which serves to collect unretained and rejected fluids.

An object of the invention is to provide a nozzle of the kind indicated, which has a funnel-shaped fluid retaining cup, circumposed on the nozzle tube, the cup being readily installed and removed from the nozzle tube, and can be adjusted therealong.

Another object of the invention is the provision of an enema nozzle cup which is adapted to contain and carry rejected material, to a disposal point, when removed from a patient.

These and other objects, which will become apparent to those skilled in the art, are attained by the present invention, a preferred form of which is described in the following specification, as illustrated in the drawing, in which:

FIGURE 1 is a perspective view of an enema nozzle of the invention,

FIGURE 2 is a view, like FIGURE 1, showing components separated,

FIGURE 3 is an axial, sectional view taken along the line 3—3 of FIGURE 1, and

FIGURE 4 is an enlarged fragmentary axial section taken through the cup and its securing means.

Referring to the drawings by characters of reference, there is shown a conventional enema nozzle having a tube 10 of plastic material having suitable stiffness and resilience, formed with a convex end 12, formed with perforations 14.

For trapping the fluids which escape or are rejected from the body of a patient, a funnel-shaped cup 16 substantially larger in diameter than the nozzle tube 10, has a relatively long, tubular stem 18 of an internal diameter affording an easy, sliding fit on the tube 10. The cup 16, while shown as an inverted frustum of a cone, may, of course have other shapes, such as cylindrical, or frustospherical, for instance, and be of a diameter and depth comporting with the maximum expected volume of rejected fluid. It may be of any material of suitable rigidity and corrosion resistance, such as plastic, or stainless steel. For safety and comfort, the cup has a rim without sharp corners, such as provided by a bead 20 shown, which is formed by turning a metal edge, or by providing a solid annulus in the case of plastic.

The cup stem 18 is secured, at its inner end, in sealing relation to the nozzle tube 10, at selected points along the tube 10, by means of a nut 24. The nut 24 is formed with an internal groove 26, which spaces a forward wall formed with internal screw threads 21, and a rear wall having a smooth-edged opening 28. The cup stem 18 has external threads 22, at its inner end, on which the forward wall is threaded, and the opening 28 of the inner wall of the nut 24 slidably receives the nozzle tube 10. A compressible and resilient sealing rind 30, which is preferably of microporous rubber, is engaged in the nut groove 26, and is circumposed on the nozzle tube 10. The ring 30 has a cylindrical opening 31, of substantially the same diameter as the nozzle tube 10, has a convex periphery 33, and a reduced diameter outer end 35, which seats in a groove 37, in the inner end of the cup stem 18.

As shown in FIGURE 3, when the nut 24 is threaded outwardly on the cup stem 18, the sealing ring 30 is compressed between the inner nut wall and the stem 18, and is compressed radially inwardly, so as to cause the ring to press against and partially indent the nozzle tube 10, so as to effectively seal the inner end of the stem 18, against escape of fluid between the stem and the tube 10, while providing frictional resistance which secures the cup stem in selected positions on the tube 10. For ready manipulation of the locking nut, the latter is provided with a knurled surface 34.

While a certain preferred embodiment has been shown and described, modifications will be apparent to those skilled in the art, in the light of this disclosure, and the invention should not, therefore, be deemed as limited, except insofar as shall appear from the spirit and scope of the appended claims.

I claim:
1. An enema nozzle comprising an elongated hollow tube having a closed perforated outer end, a fluid retaining and carrying cup having a funnel-shaped outer end portion substantially larger in diameter than the nozzle tube, a reduced diameter tubular stem on said outer end portion, said stem being engaged over the nozzle tube at a point inwardly of the outer end of the nozzle tube, said stem being externally threaded at its inner end, a nut formed with an internal annular groove larger in diameter than the stem, said groove defining and spacing outer and inner walls of the nut, said outer wall being formed with a threaded opening threaded on the stem, said inner wall being formed with a smooth opening smaller in diameter than said threaded opening, the inner wall opening slidably receiving the nozzle tube, and a compressible and resilient sealing ring engaged in the nut groove and adapted to be compressed endwise between the inner end of the cup stem and said outer nut wall and compressed radially inwardly against the nozzle tube by forward threading of the nut on the cup stem.

2. An enema nozzle according to claim 1, wherein said sealing ring has a smooth cylindrical opening receiving the nozzle tube, a convex periphery, and a reduced diameter outer end, the cup stem being formed with an internal groove at its inner end in which the reduced end of the sealing ring is seated.

References Cited by the Examiner
UNITED STATES PATENTS

| 1,161,836 | 11/15 | Brown | 128—227 |
| 1,237,111 | 8/17 | Simpson | 128—241 |
| 2,623,519 | 12/52 | Cohen | 128—184 |
| 2,811,156 | 10/57 | Bragg | 128—248 |
| 3,054,402 | 9/62 | Franwick et al. | 128—229 |

LOUIS R. PRINCE, *Primary Examiner.*
ADELE M. EAGER, *Examiner.*